(12) United States Patent
Mahrt et al.

(10) Patent No.: US 7,486,849 B2
(45) Date of Patent: Feb. 3, 2009

(54) OPTICAL SWITCH

(75) Inventors: Rainer F. Mahrt, Meilen (CH); Nikolaj Moll, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 11/476,517

(22) Filed: Jun. 28, 2006

(65) Prior Publication Data

US 2007/0019905 A1 Jan. 25, 2007

(30) Foreign Application Priority Data

Jun. 30, 2005 (EP) .................................. 05014119

(51) Int. Cl.
*G02B 6/26* (2006.01)
(52) U.S. Cl. ............................ 385/16; 385/27; 385/122
(58) Field of Classification Search .................. 385/16, 385/27, 122
See application file for complete search history.

(56) References Cited

U.S. PATENT DOCUMENTS

| | | | | |
|---|---|---|---|---|
| 6,643,439 B2* | 11/2003 | Notomi et al. | .............. | 385/125 |
| 6,925,226 B2* | 8/2005 | Lim et al. | ..................... | 385/32 |
| 6,937,781 B2* | 8/2005 | Shirane et al. | ................ | 385/16 |
| 7,263,262 B1* | 8/2007 | Covey | ......................... | 385/122 |
| 7,409,131 B2* | 8/2008 | Covey | ......................... | 385/122 |
| 2004/0033009 A1* | 2/2004 | Soljacic et al. | ................ | 385/16 |
| 2004/0114867 A1* | 6/2004 | Nielsen et al. | ................ | 385/40 |
| 2005/0157974 A1* | 7/2005 | Scherer | ...................... | 385/16 |
| 2007/0189706 A1* | 8/2007 | Covey | ......................... | 385/147 |
| 2007/0280592 A1* | 12/2007 | Furuya et al. | ................. | 385/27 |

\* cited by examiner

*Primary Examiner*—James P Hughes
(74) *Attorney, Agent, or Firm*—Lisa M. Yamonaco; Anne Vachon Dougherty (57) ABSTRACT

An optical switch, comprising an optical resonator, a first input optical waveguide optically coupled to the optical resonator for guiding a first optical signal to the optical resonator; a second input optical waveguide optically coupled to the optical resonator for guiding a second optical signal to the optical resonator; and an output optical waveguide optically coupled to the optical resonator for guiding a third optical signal from the optical resonator, wherein the optical resonator has a first region and at least one separate second region made of different materials, at least one of which is non-linear to cause different resonance frequencies of the optical resonator for different intensities of light.

10 Claims, 4 Drawing Sheets

OPTICAL SWITCH

FIELD OF THE INVENTION

The present invention refers to an optical switch, wherein an optical control signal switches another optical signal.

BACKGROUND OF THE INVENTION

In almost all fields of information technology, the data rates increase continuously. The transfer of data as electrical signals via copper wires comes to physical limits. Much higher data rates can be transferred as optical signals via fibre optic cables or other optical waveguides.

Optical signals can be switched by means of electro-optical switches. However, for many applications all-optical switches are required and/or advantageous. In an all-optical switch, a first signal carrying information encoded in modulation of the intensity or power is switched by a second optical signal. When the intensity of the second signal is higher, the first signal is transmitted and when the intensity of the second signal is lower, the first signal is blocked, or vice versa.

U.S. patent publication number 2004/0033009 A1 describes a bistable switch in a photonic crystal wherein two waveguides are arranged perpendicular to each other. At the intersection each waveguide comprises a number of rods in a line. The central rod belonging to both waveguides is larger and thereby forms a defect. The rods and the central defect form a cavity with a resonance frequency. The resonance frequency depends on the refractive indices of the materials forming the cavity. One of the materials of the cavity is a Kerr material, the refractive index of which depends on the intensity of light or the amplitude of its electric field. Via the intensity of light in one of the waveguides, the resonance frequency and hence the transparency of the cavity for light in the other waveguide is modulated.

For many applications, the switching behavior of the conventional switch of the above-cited U.S. patent publication may be insufficient. In particular, a better optical trans-conductance (i.e., a batter change of transparency in one of the waveguides for a given change of intensity in the other waveguide) is desired.

SUMMARY OF THE INVENTION

The object of the present invention is to provide an improved optical switch with a better variation of transparency for a given variation of the intensity of a control signal.

The present invention is an optical switch, comprising an optical resonator; a first input optical waveguide optically coupled to the optical resonator, for guiding a first optical signal to the optical resonator; a second input optical waveguide optically coupled to the optical resonator, for guiding a second optical signal to the optical resonator; and an output optical waveguide optically coupled to the optical resonator, for guiding a third optical signal from the optical resonator. The optical resonator comprises a first region and at least one second region in a layer. The first region comprises a first material, the at least one second region comprises one of the first material and a second material, and the first region and the at least one second region are separated from each other. At least one material comprising the optical resonator is non-linear, the non-linearity causing different resonance frequencies of the optical resonator for different intensities of light. The at least one second region is an annulus, an elliptical or oval ring, or a polygonal frame laterally enclosing the first region. Alternatively, the at least one second region comprises a number of segments of an annulus, of an elliptical or oval ring, or of a polygonal frame laterally enclosing the first region.

The present invention is based on the idea that the switching behaviour of an optical switch is more pronounced with a higher quality factor Q for the optical resonator. Furthermore, the present invention seeks to improve the quality factor Q of the optical resonator by an improved geometry with reflecting interfaces which completely enclose or at least substantially enclose the optical resonator. The reflecting interfaces are interfaces between regions with different refractive indexes.

The reflecting interfaces at least substantially enclose the optical resonator when the regions with the different refractive indices at least substantially enclose the optical resonator. In particular, the shape of such a region could be an annulus, an oval ring, a polygonal frame, a number of segments of an annulus, segments of an oval ring or segments of a polygonal frame. Special cases are a rectangular or a quadratic frame or a number of segments of a rectangular or quadratic frame.

When the reflecting interfaces at least substantially enclose the optical resonator, light is reflected more completely and the energy of the light is enclosed in the optical resonator more efficiently. Thus, the quality factor Q of the optical resonator is increased and the switching behaviour of the optical switch is more pronounced. Therefore, it is possible to control the switch with a lower intensity or power of the control signal and/or with lower modulations of the intensity of the control signal. Alternatively, for the same intensity and modulation of intensity of the control signal, a lower refractive index contrast and/or a less pronounced non-linearity of the optical resonator material is required. With the lower requirements to the non-linearity, a broader variety of non-linear materials can be used. All these aspects considered, the present invention provides a faster, more power-efficient and cheaper optical switch.

BRIEF DESCRIPTION OF THE DRAWINGS

These and other objects and features of the present invention will become clear from the following description taken in conjunction with the accompanying drawings in which.

DESCRIPTION OF THE PREFERRED EMBODIMENTS

Figure 1:
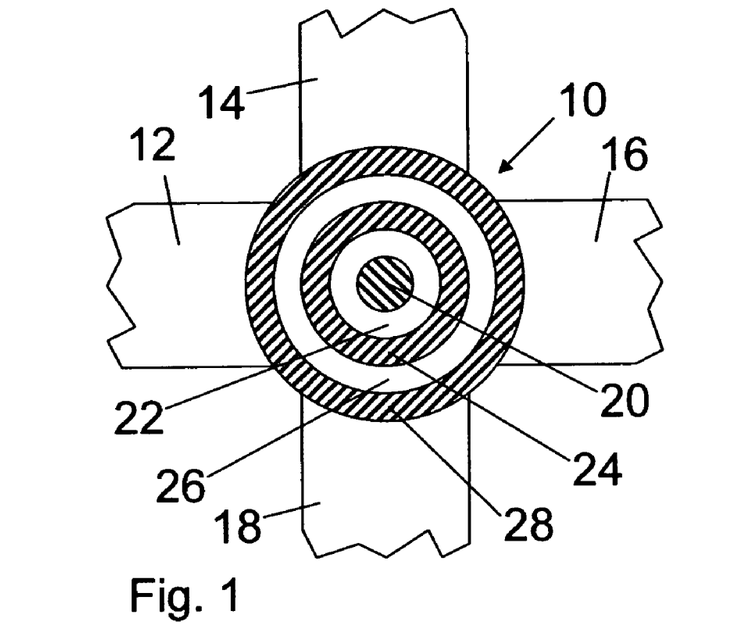
FIG. 1 is a schematic top view of an optical switch with an annular resonator.

FIG. 1 is a schematic top view of an optical switch according to a first embodiment of the present invention. The optical switch comprises an optical resonator 10 and optical waveguides 12, 14, 16, 18, optically coupled to the optical resonator 10. In the present embodiment, the four optical waveguides 12, 14, 16, 18 coupled to the optical resonator 10 are equivalent. In particular, the whole switch comprises a fourfold symmetry axis perpendicular to the drawing plane and the width of all waveguides 12, 14, 16, 18 are equal.

Also, without loss of generality, the waveguides will subsequently be referred to as a first input optical waveguide 12 for guiding a first optical signal to the optical resonator 10, a second input optical waveguide 14 for guiding a second optical signal to the optical resonator 10, a first output optical waveguide 16 for guiding a third optical signal from the optical resonator 10 and a second output optical waveguide 18 for guiding a fourth optical signal from the optical resonator 10. The first input optical waveguide 12 and the first optical signal will also be referred to as signal input optical waveguide and input signal, respectively. The second input optical waveguide 14 and the second optical signal will also be referred to as control input optical waveguide and control input, respectively. The first output optical waveguide 16 and the third optical signal will also be referred to as signal output optical waveguide and output signal, respectively. The second output optical waveguide and the fourth optical signal will also be referred to as control output optical waveguide and control output, respectively. However, it is again emphasized that, at least in case of the higher symmetry displayed in FIG. 1, input and output as well as signal and control may be interchanged.

The optical switch is arranged in a plane and the optical resonator 10 and all the waveguides 12, 14, 16, 18 are at least substantially part of one and the same layer. This layer is laterally inhomogeneous as the optical resonator 10 comprises at least two different materials and the materials of the waveguides 12, 14, 16, 18 are different from the material or the materials of laterally adjacent regions. The materials of the layers vertically adjacent to the optical switch (i.e., below and above the layer of the optical switch) are preferably different from at least one material of the optical resonator 10 and from the materials of the waveguides 12, 14, 16, 18, as well.

Different refractive indices of the optical switch 10 and the laterally and vertically adjacent regions cause a reflection of light at the interfaces and an inclusion of the light, the electromagnetic fields of the light, and the energy and power of the light within the optical resonator 10 and waveguides 12, 14, 16, 18. As a typical and preferred example, the waveguides 12, 14, 16, 18 are made from silicon with a refractive index of 3.45.

The optical resonator 10 comprises a central rod 20 and concentric annular rings 22, 24, 26, 28 with alternating materials. The central rod 20 comprises a first material, the second and the fourth rings 24, 28 comprise a second material and the first and third rings 22, 26 comprise a third material. The first material of the central rod 20 provides a refractive index that depends on the intensity of light in the central rod. In particular, the first material can be a Kerr material. The refractive indices of the second and third materials are different from each other but do not provide the Kerr-effect.

In other words, the optical resonator comprises a first region, here the central rod 20, comprising a first material and a second region, here the second ring 24, comprising a second material, the first and second regions being separated from each other by the first ring 22 comprising the third material. The second region 24 encloses the first region 20. The fourth ring 28 is also referred to as another second region which here encloses the second region 24. So the embodiment comprises a first region 20 and several second regions 24, 28 arranged in a nested manner. This embodiment could be developed further by more second regions, and again it would be provided that the next second region encloses the other second regions in a nested manner.

The refractive index of the third material of the first and third rings 22, 26 is different from the refractive indices of the first material of the central rod 20 and the second material of the second and fourth rings 24, 28. Thus, light is reflected from the interfaces between the central rod 20 and the first ring 22, between the first ring 22 and the second ring 24, between the second ring 24 and the third ring 26, between the third ring 26 and the fourth ring 28 and between the fourth ring 28 and the waveguides 12, 14, 16, 18. Depending on the wavelength of the light and the distances between the interfaces, reflected light interferes constructively or destructively, wherein the wavelength in the first, second and third materials rather than the vacuum wavelength is relevant. The case of maximum constructive interference is called the resonance of the optical resonator 10 and the corresponding frequency of light is called the resonance frequency or eigenfrequency. For the resonance frequency, the transparency of the optical resonator 10 is maximum, such that a maximum fraction of light coupled into the optical resonator 10 via the first or second input optical waveguides 12, 14 is coupled out from the optical resonator 10 via the first or second output optical waveguides 16, 18, respectively. For other frequencies, the transparency of the optical resonator 10 is lower.

Compared to the optical resonators of conventional optical switches, the optical resonator 10 provides a higher quality factor Q, whereby in case of resonance the light and the energy of light is enclosed in the optical resonator 10 particularly efficiently and the transparency of the optical resonator 10 as a function of the frequency has a particularly sharp or narrower maximum. This is due to the fact that the optical resonator 10 comprises closed rings, the interfaces between which reflect light of any direction of propagation.

The resonance depends on the correlation between the wavelength of the light in the optical resonator 10 and the geometry of the optical resonator 10, in particular the distances between the interfaces or the width of the rings 22, 24, 26, 28. Due to the non-linear material comprised in the central rod 20, for light of a given frequency the refractive index of the central rod 20 depends on the intensity of light in the optical resonator 10. Thus, the resonance frequency and the transparency of the optical resonator 10 for light with a given wavelength or frequency depend on the intensity of light in the optical resonator 10.

The optical switch displayed in FIG. 1 is preferably operated as follows:

A main signal is guided by the first input optical waveguide 12 and coupled into the optical resonator 10. As a preferred example, the intensity of the main signal is modulated, thereby encoding information. A control signal is guided by the second input optical waveguide 14 and coupled into the optical resonator 10. By means of the intensity of the control signal, the resonance frequency and the transparency of the optical resonator 10 for the main signal are controlled. Preferably, with the control signal off or for a relatively low intensity of the control signal, the resonance frequency of the optical resonator 10 is off the frequency of the main signal and the transparency of the optical resonator 10 for the main signal is lower. With the control signal on or for a higher intensity of the control signal and the main signal on or a higher intensity of the main signal, the resonance frequency of the optical resonator 10 equals the frequency of the main signal and the transparency of the optical resonator 10 for the main signal is higher.

As will be described in more detail below with respect to FIG. 7, the main signal coupled into the optical resonator 10 via the first input optical waveguide 12 is coupled out from the optical resonator 10 merely via the first output optical waveguide 16, and the control signal coupled into the optical resonator 10 via the second input optical waveguide 14 is coupled out from the optical resonator 10 merely via the second output optical waveguide 18. With a lower intensity control signal, a third optical signal similar to the main signal but with lower or even negligible intensity is coupled out from the optical resonator 10 via the first output optical waveguide 16. When the intensity of the control signal is higher, the third optical signal coupled out from the optical resonator 10 via the first output optical waveguide 16 is substantially the main signal with insignificantly dampened intensity.

Thus, with the optical switch according to the present invention, a first optical signal is switched by a second optical signal. In other words, the optical switch according to the present invention provides a third optical signal, the intensity of which depends on the intensities of both a first optical signal and a second optical signal coupled into the optical switch via two different optical waveguides 12, 14.

As mentioned above, the optical resonator 10 according to the present invention has a higher quality factor Q resulting in a more pronounced resonance and a narrower maximum of the transparency at the resonance frequency. The higher quality factor causes a stronger amplification of the intensity of the control signal inside the optical resonator 10. Thus, lower and medium intensities of the control signal in the second input optical waveguide 14 cause a higher intensity inside the optical resonator 10 and a stronger change of the refractive index of the material of the central rod 20 and a stronger change of the resonance frequency of the optical resonator 10. Furthermore, the more pronounced resonance and the resulting narrower maximum of the transparency cause a larger change of the transparency for a smaller change of the resonance frequency. Both effects cause a more pronounced switching behavior of the optical switch.

While according to the above description, the optical switch is on for a higher intensity control signal and off for a lower intensity control signal, the operation of the optical switch may be inversed, as well, with the optical switch off for a higher intensity control signal and on for a lower intensity control signal. For this alternative, the resonance frequency of the optical resonator 10 is off the frequency of the main signal for a higher intensity control signal and the resonance frequency of the optical resonator 10 equals the frequency of the main signal for a lower intensity control signal. For the isotropic optical resonator 10 displayed in FIG. 1, the inverse switching operability prefers different frequencies, or wavelengths, respectively, of the main signal and the control signal.

Since the refractive index of the Kerr material of the central rod 20 depends on the total intensity in the optical resonator 10, the optical switch can be switched by the intensity of the main signal, as well. Therefore, the maximum intensity of the main signal is preferably such that the main signal alone does not change the transparency of the optical resonator 10.

The first embodiment described above with reference to FIG. 1 comprises an isotropic optical resonator 10 with a single resonance behavior for light propagating in any direction. However, the inventive optical switch may be provided with an anisotropic optical resonator 10 with a resonance behavior depending on the direction of the propagation of light, as well.

Figure 2:
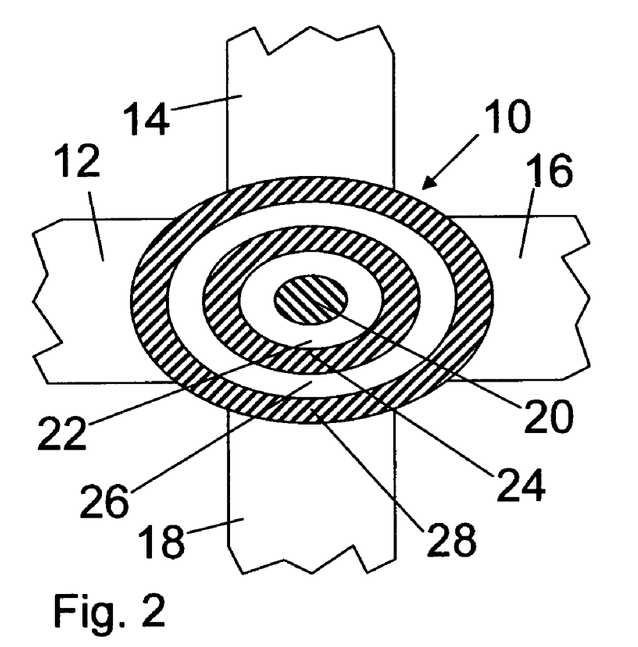
FIG. 2 is a schematic top view of an optical switch with an elliptic resonator.

FIG. 2 is a schematic top view of an optical switch with an elliptical resonator 10. In this embodiment, the central rod 20 and the rings 22, 24, 26, 28 forming the optical resonator 10 are not circular or annular, but elliptical. Therefore, the distances between interfaces of regions with different refractive indices are different for light propagating in the direction of the first input optical waveguide 12 and the first output optical waveguide 16 and for light propagating in the direction of the second input optical waveguide 14 and the second output optical waveguide 18. Accordingly, the optical resonator 10 provides different resonance frequencies for light coupled in via the first input optical waveguide 12 and for light coupled in via the second input optical waveguide 14. Therefore, with the optical switch displayed in FIG. 2, a first optical signal with a first wavelength can switch a second optical signal with a second wavelength different from the first wavelength.

Furthermore, the optical switch displayed in FIG. 2 may serve as an inverting switch for a main signal and a control signal with equal or different wavelengths wherein when the switch is on, there is more transparency for the main signal and for a lower intensity control signal and off, it is less transparent for the main signal, for a higher intensity control signal.

The option to use different wavelengths for the main signal and the control signal develops a spectrum of new application and reduces the coupling of the control signal into the signal output optical waveguide. Also here, the second region 24 encloses the first region 20. The fourth ring 28 is also referred to as another second region which here encloses the second region 24. So the embodiment comprises a first region 20 and several second regions 24, 28 arranged in a nested manner. This embodiment could be developed further by more second regions, and again it would be provided that the next second region encloses the other second regions, hence again in a nested manner.

As an alternative to the elliptical geometry of the optical resonator 10 displayed in FIG. 2, the central rod 20 and the rings 22, 24, 26, 28 can be oval, their interfaces being composed of 90° or 180° circular arcs and straight lines. This shape is sometimes produced more easily in a lithographic process than is the case with an elliptical shape.

Figure 3:
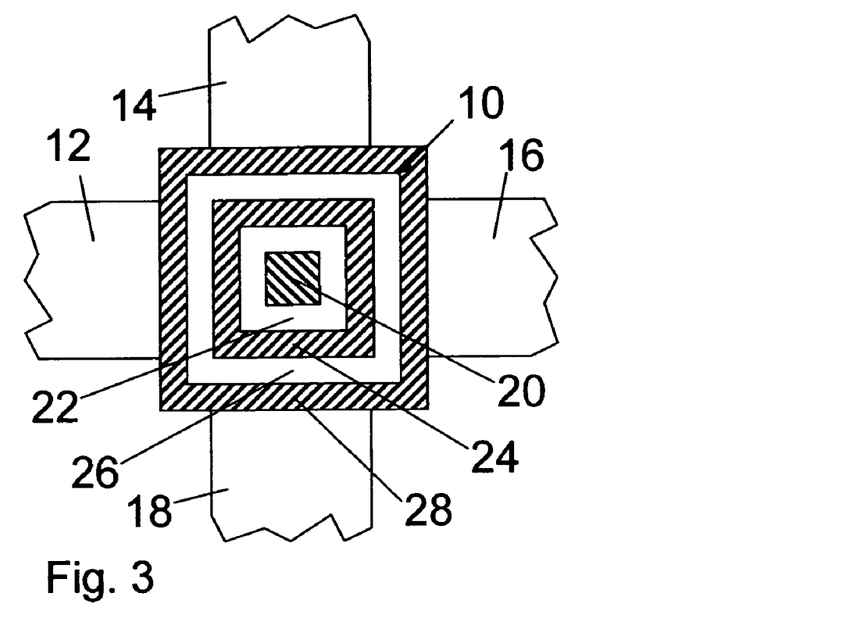
FIG. 3 is a schematic top view of an optical switch with a square resonator.
Figure 4:
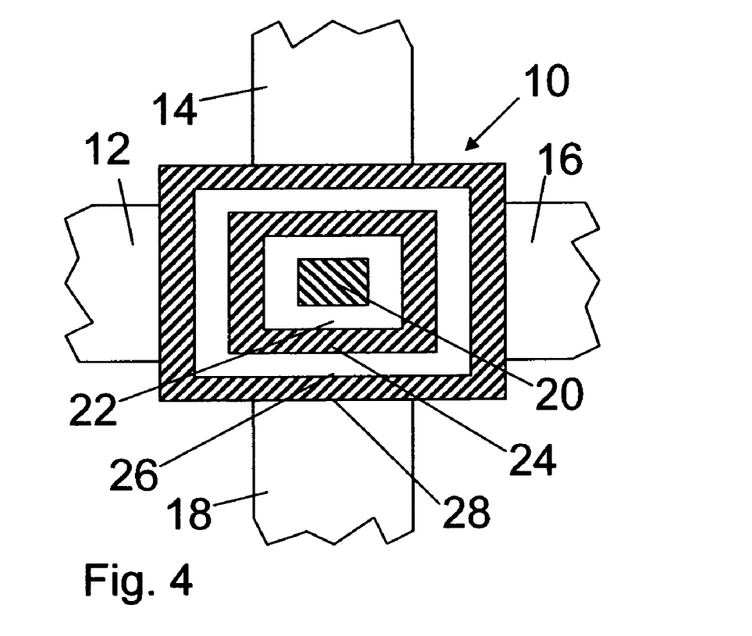
FIG. 4 is a schematic top view of an optical switch with a rectangular resonator.

As a further alternative, the optical resonator 10 is composed of a polygon-shaped central rod 20 surrounded or encircled by a number of polygon-shaped frames 22, 24, 26, 28. Particularly, the optical resonator 10, its central rod 20 and its frames 22, 24, 26, 28 may be quadratic as displayed in FIG. 3 or rectangular as displayed in FIG. 4. As the circular optical resonator of the optical switch described above with reference to FIG. 1, the quadratic optical resonator 10 of the optical switch displayed in FIG. 3 provides the same resonance frequency for signals coupled into the optical resonator 10 via any of the optical waveguides 12, 14, 16, 18. As the elliptical optical resonator of the optical switch described above with reference to FIG. 2, the rectangular optical resonator 10 of the optical switch displayed in FIG. 4 provides different resonance frequencies for light coupled into the optical resonator 10 from the first input optical waveguide 12 or from the first output optical waveguide 16 and for light coupled into the optical resonator from the second input optical waveguide 14 or from the second output optical waveguide 18.

As already mentioned above, the advantageous switching behavior of the optical switch stems from the higher quality factor of the optical resonator 10 which in turn stems from the fact that the reflecting interfaces between regions of different refractive indexes completely enclose the optical resonator 10 or, to be more specific, its centre. However, one or several gaps in the rings or frames 22, 24, 26, 28 and in the reflective interfaces between the rings or frames reduce the quality factor Q of the optical resonator 10 merely to a smaller extent.

Therefore, although closed rings or frames 22, 24, 26, 28 are preferred, the optical switch described here may also be an optical switch with an optical resonator 10 comprising a number of gaps in one of the rings or frames 22, 24, 26, 28 or in several of the rings or frames.

Figure 5:
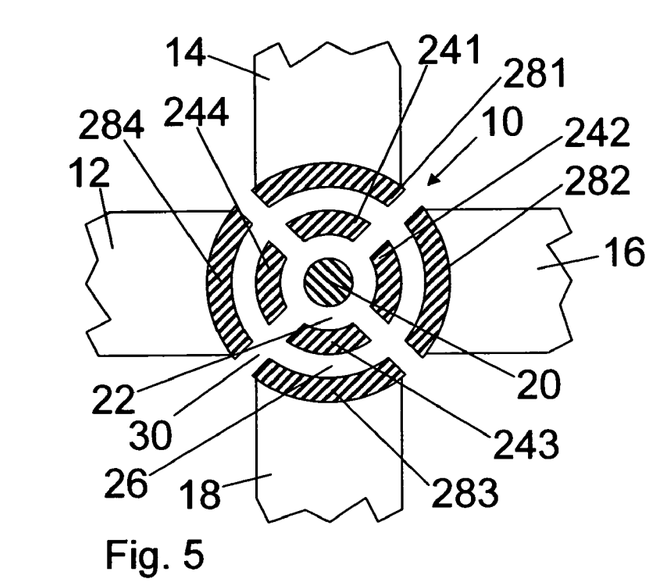
FIG. 5 is a schematic top view of an optical switch with an annular resonator with gaps.

FIG. 5 is a schematic top view of an optical switch with an annular-like resonator structure. This embodiment differs from the embodiment described above with reference to FIG. 1 in that each of the second and fourth rings 24, 28 is segmented into four segments 241, 242, 243, 244 or 281, 282, 283, 284, respectively, by gaps 30. The gaps 30 are positioned between the optical waveguides 12, 14, 16, 18. Hence, here the second region 24 by means of its segments 241, 242, 243, 244 substantially encloses the first region 20. The segments 281, 282, 283, 284 of the fourth ring 28 constitute another second region which here substantially encloses the second region 24. So the embodiment comprises also here a first region 20 and several second regions 24, 28 arranged in a nested manner. This embodiment could be developed further by more second regions, and again it would be provided that the next second region encloses the other second regions, hence again in a nested manner. Any of the regions can but need not be divided into segments.

Figure 6:
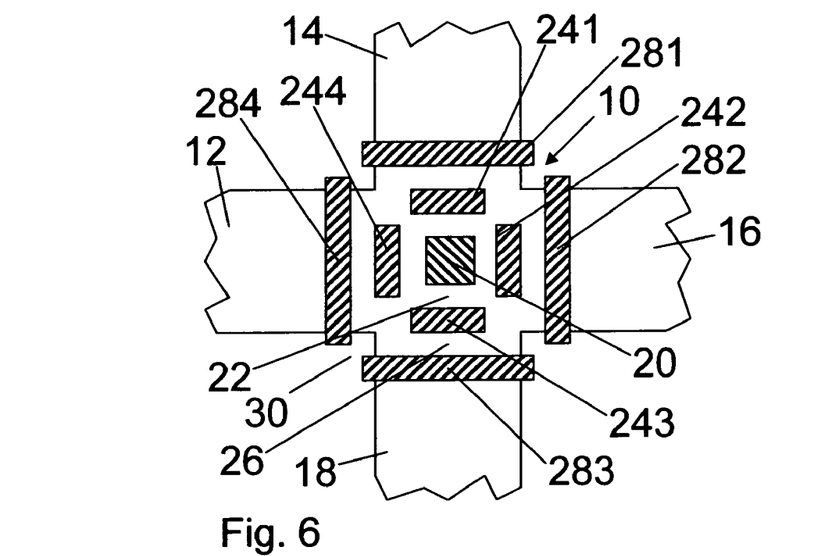
FIG. 6 is a schematic top view of an optical switch with a quadratic resonator with gaps.

FIG. 6 is a schematic top view of an optical switch with a square-like resonator structure. This embodiment differs from the third embodiment described above with reference to FIG. 3 in that the second and fourth quadratic frames 24, 28 of the optical resonator 10 are subdivided into segments 241, 242, 243, 244, or 281, 282, 283, 284, respectively, by smaller gaps 30.

The gaps 30 are positioned at the corners of the quadratic frames 24, 28 and, hence, between the optical waveguide 12, 14, 16, 18. Thereby, the segments 241, 242, 243, 244, 281, 282, 283, 284 are straight strips. The segments may be rectangular as displayed in FIG. 6 or shaped like trapezoids.

The gaps 30 only slightly reduce the quality factor Q of the optical resonators 10 displayed in FIGS. 5 and 6. Furthermore, the resonator modes or eigenmodes of the optical resonator 10 are only slightly influenced by the smaller gaps 30. The gaps 30 may, for example, be used for stabilizing the orthogonality of modes that will be described below with reference to FIG. 7. Furthermore, the quality factors Q of the optical resonator 10 for both directions of propagation may be modified selectively and independently by the arrangement, number and size of the gaps 30.

For example, gaps 30 are not arranged between the optical waveguides 12, 14, 16, 18 as displayed in FIGS. 5 and 6, but in the direction of the second input optical waveguide 14 and/or the second output optical waveguide 18. Thereby, the resonance frequency for light coupled into the optical resonator 10 from the second input optical waveguide 14 or from the second output optical waveguide 18 is lower than for light coupled into the optical resonator 10 from the first input optical waveguide 12 or from the first output optical waveguide 16. By means as this, the switching behavior of the optical switch according to the present invention can be tuned more precisely and its transparency can be enhanced.

Of course, the gaps as described above with reference to FIGS. 5 and 6 may be introduced to optical switches with elliptical, oval, polygonal or rectangular optical resonators 10, as well.

For most applications, a coupling of the control signal into the signal output optical waveguide 16 is adverse and undesired because in this case a mixture of the main signal and the control signal are coupled out from the optical resonator 10 via the signal output optical waveguide 16. It is reduced or prevented by an orthogonality of the optical resonator mode coupled to and stimulated by the first input optical waveguide 12 and the first output optical waveguide 16 and the optical resonator mode coupled to and stimulated by the second input optical waveguide 14 and the second output optical waveguide 18. This orthogonality is subsequently described with reference to FIG. 7.

Figure 7:
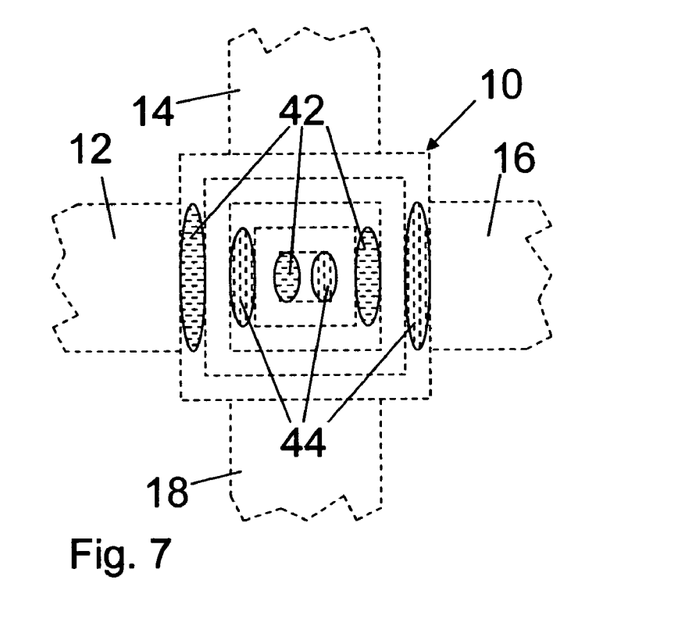
FIG. 7 is a schematic representation of electric fields in an optical switch.

FIG. 7 is a schematic top view of the optical resonator according to the embodiment described above with reference to FIG. 3. For clarity reasons, a part of the reference numerals of FIG. 3 are omitted in FIG. 7. Instead, first and second maximum field regions 42, 44 are shown. The maximum field regions 42, 44 schematically represent the regions with higher electric fields according to a first eigenmode of the optical resonator 10. Between the maximum field regions 42, 44, regions with weaker electrical fields exist. In this first eigenmode at each and any moment, the electric field in a first maximum field region 42 and the electric field in a second maximum field region 44 have opposite sign or direction or both vanish. This is indicated by different hatchings of the first and second maximum field regions 42, 44 in FIG. 7.

First and second maximum field regions 42, 44 are arranged in an alternate manner. The mode represented by the first and second maximum field regions 42, 44 is even with respect to an axis defined by the first input optical waveguide 12 and the first output optical waveguide 16 and odd with respect to an axis defined by the second input optical waveguide 14 and the second output optical waveguide 18. Light in the first input optical waveguide 12 or in the first output optical waveguide 16 couples to the first eigenmode. There is no coupling between light in the second input optical waveguide 14 or in the second output optical waveguide 18 and the first eigenmode.

It is clear that there is a second eigenmode of the optical resonator 10 which is rotated around the fourfold symmetry axis of the optical resonator 10 by 90° with respect to the first eigenmode displayed in FIG. 7. The second eigenmode is even with respect to the axis defined by the second input optical waveguide 14 and the second output optical waveguide 18 and odd with respect to the first input optical waveguide 12 and the first output optical waveguide 16. The second eigenmode is coupled to light in the second input optical waveguide 14 and the second output optical waveguide 18, but there is no coupling between the second eigenmode and light in the first input optical waveguide 12 or light in the first output optical waveguide 16.

Since the first eigenmode coupled to the first input optical waveguide 12 is odd and the second eigenmode coupled to the second input optical waveguide 14 is even with respect to the same symmetry axis, the first and second eigenmodes are orthogonal and there is no coupling between them. As everyone skilled in the art will appreciate, this can be proved easily although this proof is not given in this text. Due to the zero coupling between the eigenmodes of the optical resonator 10, light coupled into the optical resonator 10 via the first input optical waveguide 12 or the first output optical waveguide 16 is not coupled out of the optical resonator 10 via the second input optical waveguide 14 or the second output optical waveguide 18; and light coupled into the optical resonator 10 via the second input optical waveguide 14 or the second output optical waveguide 18 is not coupled out of the optical resonator 10 via the first input optical waveguide 12 or the first output optical waveguide 16.

Although in FIG. 7 the eigenmode of the quadratic optical resonator 10 of the third embodiment described above with reference to FIG. 3 is displayed, the same holds true for the other embodiments described above with reference to FIGS. 1, 2 and 4.

Furthermore, for general geometries of optical resonators, there is no coupling between the first eigenmode coupled to the first input optical waveguide 12 and the second eigenmode coupled to the second input optical waveguide 14 as long as these eigenmodes are orthogonal. Orthogonality is given anyway for eigenmodes with different eigenfrequencies, e.g. embodiments displayed in FIGS. 2 and 4.

Orthogonality is not necessarily given when the first and second eigenmodes are degenerate with respect to the frequency. The first and second eigenmodes are orthogonal when they are eigenfunctions of the same symmetry operator with different eigenvalues. To be more specific, the eigenmodes are orthogonal when one of them is even and the other is odd with respect to the same symmetry axis.

In addition to orthogonality of the first and second eigenmodes, it is crucial that light in one of the optical waveguides selectively couples to only one of the eigenmodes. This is the case when the symmetry of the light in the optical waveguide equals the symmetry of the eigenmode but is different from the symmetry of any other eigenmode with the same eigenfrequency. At least for a narrower optical waveguide, e.g. single mode optical waveguide, the symmetry of the waveguide determines the symmetry of the light in the waveguide.

Therefore, there is no coupling of light in a first optical waveguide and light in a second optical waveguide via the optical resonator when the first eigenmode of the resonator is even with respect to the symmetry axis of the first optical waveguide and the second eigenmode is even with respect to the symmetry axis of the second optical waveguide and odd with respect to the symmetry axis of the first optical waveguide, wherein the symmetry of each eigenmode is strongly correlated to the symmetry of the resonator.

Accordingly for embodiments with gaps 30 described above with reference to FIGS. 5 and 6, preferably the optical resonator 10 is symmetric with respect to both the symmetry axis defined by the first input optical waveguide 12 and the first output optical waveguide 16 and the symmetry axis defined by the second input optical waveguide 14 and the second output optical waveguide 18. This particularly refers to the arrangement of the gaps 30.

There are applications without the requirement to avoid any outcoupling of the control signal via the signal output optical waveguide or of the main signal via the control output optical waveguide. In these cases the whole optical switch may provide a lower symmetry. For these applications, the embodiments described above with reference to FIG. 1 to 6 may be modified in many ways. For example, the perpendicularity of the waveguides 12, 14, 16, 18 and/or the symmetry with respect to a change of input and output or with respect to a change of control and main signal can be abandoned in favor of an otherwise larger freedom of design. For example, the second output optical waveguide 18 can be omitted.

Numerous further modifications of the above-described embodiments are within the scope of the present invention. In particular, the central rod 20 and the second and fourth rings or frames 24, 28 may comprise the same material or different materials. The materials of the first and third rings 22, 26 may be equal or different from each other. The first and/or the second rings 22, 26 may be segmented. A non-linear material with a dependency of the refractive index on the intensity of light may be comprised in one or more of the rings or frames 22, 24, 26, 28, as well. The non-linear material may be a Kerr material or any other material with a refractive index depending on the intensity. The number of rings or frames 22, 24, 26, 28 may be smaller or larger than in the above-described embodiments.

Figure 8:
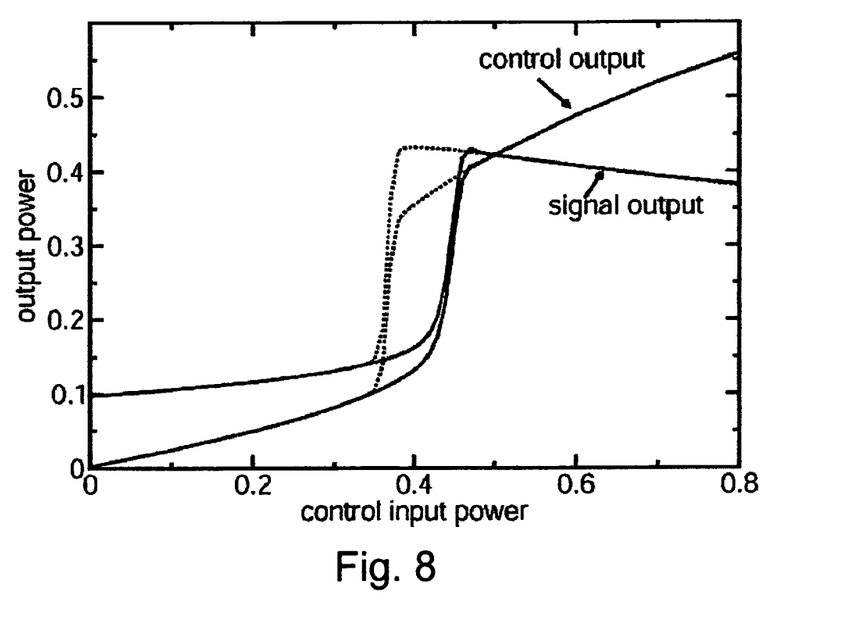
FIG. 8 is a schematic diagram demonstrating the operation of an optical switch.

FIG. 8 is a schematic diagram displaying the results of measurements at the described optical switch and similar to the first embodiment described above with reference to FIG. 1. The control input power (i.e., the power of the control input signal) provided for example via the second input optical waveguide 14, is assigned to the abscissa and the output power (i.e., the power of the main signal output) coupled out for example from the optical resonator 10 via the first output optical waveguide 16, and the power of the control signal output (e.g., coupled out from the optical resonator 10 via the second output optical waveguide 18) is assigned to the ordinate. Both the control input power and the output power are given in arbitrary units, referred to as a.u.. The signal input power, e.g. provided via the first input optical waveguide 12, during the measurement was 0.5 a.u..

Both the signal output power and the control output power show hysteresis wherein the solid lines represent the main signal output during an increase of the control input power and the broken lines represent the main signal output during a decrease of the control input power.

The switching behavior of the optical switch is visible in the signal output power. For a control input power below about 0.4 a.u., the signal output power is lower below about 0.15 a.u.. Slightly above a smaller increment of the control input power by about 0.05 a.u. causes a drastic increase of the signal output power by more than 0.25 a.u. to more than 0.4 a.u.. When the control input power decreases, this switching operation is reversed at a control input power slightly below 0.4 a.u.. Hence, the optical switch may be operated reliably with a control input power below about 0.3 a.u. or above about 0.5 a.u., wherein the switch is on for a control input power of about 0.5 or above and off for a control input power of about 0.3 or below.

Any of the described embodiments can be combined in whole or in part without departing from the invention as set forth in the appended claims.

The invention claimed is:

1. An optical switch, comprising:
an optical resonator for switching between states of transparency and opaqueness with respect to transmission of optical signals based on intensity of input optical signals;
a first input optical waveguide optically coupled to the optical resonator, for guiding a first optical signal to the optical resonator;
a second input optical waveguide optically coupled to the optical resonator, for guiding a second optical signal comprising an optical switch control signal to the optical resonator; and
an output optical waveguide optically coupled to the optical resonator, for guiding a third optical signal from the optical resonator,
wherein the optical resonator comprises a first region and a plurality of second regions in a layer, the first region comprising a first material, at least one second region comprising a second material having a different refractive index from said that of said first material and wherein said plurality of second regions are arranged in a nested manner with respect to each other,
wherein at least one material comprising the optical resonator is non-linear, the non-linearity causing different resonance frequencies of the optical resonator for different intensities of light of at least said optical switch control signal, and
wherein the at least one second region laterally encloses all or part of the first region.

2. The optical switch according to claim 1, wherein the at least one second region has a shape selected from the group consisting of an annulus, an elliptical ring, an oval ring, a polygonal frame, a rectangular frame, a quadratic frame, a number of segments of an annulus, a number of segment of an elliptical ring, a number of segments of an oval ring, a number of segments of a rectangular frame, a number of segments of a quadratic frame, and a number of segments of a polygonal frame.

3. The optical switch according to claim 1, wherein the first region is substantially concentric to the at least one second region.

4. The optical switch according to claim 1, wherein at least one of the materials of the optical resonator exhibits a Kerr non-linearity.

5. The optical switch according to claim 1, further comprising:
an additional output optical waveguide coupled to the optical resonator, for guiding a fourth optical signal from the optical resonator.

6. The optical switch according to claim 5, wherein the first and second input optical waveguides are arranged substantially perpendicular to each other,
the output optical waveguide is arranged substantially collinear to the first input optical waveguide, and
the additional output optical waveguide is arranged substantially collinearly to the second input optical waveguide.

7. The optical switch according to claim 6, wherein the optical resonator provides a first resonator mode which is odd with respect to an axis defined by the first input optical waveguide and the output optical waveguide, and
a second resonator mode which is even with respect to an axis defined by the first input optical waveguide and the output optical waveguide.

8. The optical switch according to claim 7, wherein the first and second resonator modes are the lowest resonator modes.

9. The optical switch according to claim 7, wherein the first and second resonator modes are degenerate with respect to the photon energy.

10. A method for providing switching of optical signals comprising the steps of:
providing a first input optical waveguide optically coupled to an optical resonator, for guiding a first optical signal to the optical resonator;
providing a second input optical waveguide optically coupled to the optical resonator, for guiding a second optical signal comprising an optical switch control signal to the optical resonator; and
providing an output optical waveguide optically coupled to the optical resonator, for guiding a third optical signal from the optical resonator,
providing an optical resonator wherein the optical resonator comprises a first region and a plurality of second regions in a layer, the first region comprising a first material, the at least one second region comprising a second material having a different refractive index from that of said first region, wherein said plurality of second regions are arranged in a nested manner with respect to each other,
wherein at least one material comprising the optical resonator is non-linear, the non-linearity causing different resonance frequencies of the optical resonator for different intensities of light, and
wherein the at least one second region laterally encloses all or part of the first region; and
selectively controlling the intensity of at least the optical switch control signal along said second input optical waveguide to control the resonance frequency of the optical resonator to switch between transmission and opaqueness for transmission of output optical signals.

* * * * *